United States Patent
Yamashita

(10) Patent No.: US 6,800,008 B2
(45) Date of Patent: Oct. 5, 2004

(54) METHOD AND APPARATUS FOR REMOVING FILM AND METHOD FOR MANUFACTURING DISPLAY PANEL

(75) Inventor: Takehiko Yamashita, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 10/268,396

(22) Filed: Oct. 9, 2002

(65) Prior Publication Data

US 2003/0068953 A1 Apr. 10, 2003

(30) Foreign Application Priority Data

Oct. 9, 2001 (JP) ........................................ 2001-311891

(51) Int. Cl.$^7$ ................................................. H01J 9/50
(52) U.S. Cl. ............................................ 445/2; 134/34
(58) Field of Search ............................ 445/24, 25, 50, 445/51; 134/117, 198, 34, 35

(56) References Cited

U.S. PATENT DOCUMENTS

| | | | |
|---|---|---|---|
| 3,990,462 A | * 11/1976 | Elftmann et al. | ........ 134/102.1 |
| RE35,611 E | 9/1997 | McComas et al. | |
| 5,738,730 A | 4/1998 | Tojo et al. | |
| 5,942,045 A | 8/1999 | Raghavan et al. | |
| 6,260,562 B1 | 7/2001 | Morinishi et al. | |
| 6,517,635 B2 | * 2/2003 | Mitsumori et al. | ........... 134/34 |

FOREIGN PATENT DOCUMENTS

| | | | | |
|---|---|---|---|---|
| DE | 197 03 104 | | 7/1998 | |
| EP | 0 430 856 | | 6/1991 | |
| FR | 2 630 667 | | 11/1989 | |
| JP | 7-31940 | | 2/1995 | |
| JP | 411104610 A | * | 4/1999 | ............. H01J/9/50 |
| JP | 2000-51799 | | 2/2000 | |
| WO | WO 93/23170 | | 11/1993 | |

* cited by examiner

*Primary Examiner*—Joseph Williams
(74) *Attorney, Agent, or Firm*—Merchant & Gould P.C.

(57) ABSTRACT

A method and an apparatus for removing a film from a display panel are provided that can remove even a film with relatively high strength that is stuck on a display panel without relying on manual work and also can reduce the operating cost. The apparatus that removes a film stuck on a display panel by injecting a liquid includes a liquid injector and a carrier. The liquid injector injects the liquid in the direction that tilts with respect to a normal to the surface of the display panel on which the film is stuck. The carrier transports the display panel. The liquid injector starts the injection of the liquid at the boundary between one end of the film and the display panel on the side of the transport direction. The liquid is injected while transporting the display panel so that the film is removed successively from one end to the other end in the opposite direction to the transport direction.

16 Claims, 5 Drawing Sheets

METHOD AND APPARATUS FOR REMOVING FILM AND METHOD FOR MANUFACTURING DISPLAY PANEL

BACKGROUND OF THE INVENTION

1. Field of the Invention

The present invention relates to a method and apparatus for removing a film from a display panel. In particular, the present invention relates to a method and apparatus for removing successively and automatically the film that is stuck on the surface of a CRT (cathode ray tube) panel or thin display panel, typified by a PD (plasma display) panel. Moreover, the present invention relates to a method for manufacturing a new display panel by using a material obtained from a display panel after removal of the film.

2. Description of the Related Art

To recycle the cathode ray tubes (CRTs) of televisions or monitors that have been disposed of as glass, first, the CRTs should be divided generally into two portions: panels and funnels. Then, each of the portions is pulverized into small glass pieces (hereinafter, referred to as "pellets"), and the pellets are used again as part of a CRT material.

In recent years, various resin films have been attached to a CRT surface to improve the function. However, the resin films mixed in pellets degrade the quality of CRT glass. Therefore, those resin films should be removed from the CRT surface beforehand. FIG. 5 shows a conventional process of removing a resin film.

As shown in FIG. 5, the resin film is peeled off manually by a worker in a conventional removal operation. This operation requires many man-hours, which in turn increases the cost. In general, the adhesive strength of the film becomes larger with time. Accordingly, a very large force is needed to remove the film, so that a heavy workload is imposed on the worker. Moreover, the above problem affects the recycling cost of CRTs and hampers the promotion of recycling CRTs.

In particular, when the adhesive strength between the CRT surface and an adhesive of the resin film is larger than that between a base film of the resin film and the adhesive, the adhesive is left on the CRT surface, while the base film is removed. This is so-called adhesive residue. The adhesive residue causes a defect when the remaining adhesive is mixed in the pellets because the adhesive also is made of a resin material. In this case, a worker again has to remove the adhesive that adheres to the CRT surface, e.g., with a metallic spatula, which becomes a heavy burden for the worker.

When the adhesive strength of an adhesive is more than 2000 g/inch (787 g/cm), it exceeds the breaking strength of a resin film. Therefore, the film may be ruptured during the removal operation. In this case, a portion of the resin film is not removed but is left on the CRT surface, so that a considerable amount of time and man-hours is necessary to remove the entire film.

When a resin film is not removed sufficiently from the CRT surface, the CRT with the resin film cannot be recycled and has to be disposed of as industrial wastes. However, such disposal is not preferable in view of environmental protection.

JP 7(1995)-31940 A discloses a method for removing a resin film with a water jet. According to this method, an injection nozzle having a plurality of injection holes that are arranged in line is rotated to inject water onto a resin film in the direction perpendicular to the film surface, and thus the resin film is removed and scattered by the jets of water.

However, the above method can remove only a resin film with relatively low strength that has a thickness of about 50 $\mu$m because water is injected in the direction perpendicular to the film surface. Moreover, the amount and pressure of water required to remove the film becomes excessive for the same reason, which leads to an increase in size and operating cost of the apparatus.

JP 7(1995)-31940 A also discloses an apparatus for implementing the water-jet removal method. This apparatus includes a table for carrying an object on which a resin film is stuck and an injection nozzle that can move in both X and Y directions on the table.

However, the above apparatus has the disadvantage of increasing the cost of equipment because it is necessary to scan the injection nozzle in accordance with the shape of the object to remove the resin film. Moreover, the apparatus performs a batch-type removal operation, thus reducing efficiency.

Other removal methods, e.g., sandblasting, are known as well. The sandblasting uses an abrasive material to remove a resin film. Therefore, the abrasive material should be retrieved after removing the resin film. Moreover, a washer is needed to wash the abrasive material off the object from which the resin film has been removed.

SUMMARY OF THE INVENTION

Therefore, with the foregoing in mind, it is an object of the present invention to provide a method and apparatus for removing a film that can remove even a film with relatively high strength that is stuck on a display panel without relying on manual work and also can reduce the operating cost. It is another object of the present invention to provide a method for manufacturing a display panel that employs the film removal method and apparatus.

A method for removing a film from a display panel of the present invention includes subjecting a film stuck on a display panel to an injected liquid. The liquid is injected in the direction that tilts with respect to a normal to the surface of the display panel on which the film is stuck.

In the above method, it is preferable that the injection of the liquid is started at the boundary between one end of the film and the display panel so as to remove the film successively from said one end to the opposite end.

In this example, it is particularly preferable that the liquid is injected while transporting the display panel so that the film is removed successively from said one end to the opposite end. Moreover, it is preferable that the liquid is injected in the form of a fan.

The above method is effective when the display panel is one selected from a CRT panel and a PD panel. In this case, it is preferable that a height of the display panel is detected, and a position at which the liquid is injected is moved up or down in accordance with the height of the display panel.

In the above method, it is preferable that the removed film should be carried away by an air flow. Moreover, it is preferable that the angle between the direction of injection and the normal is in the range of 40 degrees to 50 degrees. It is preferable that the liquid is injected so that the injection pressure is in the range of 300 kg/cm$^2$ to 1300 kg/cm$^2$ and the flow rate is in the range of 10 l/min. to 50 l/min.

An apparatus for removing a film of the present invention is intended to remove a film stuck on a display panel by injecting a liquid. The apparatus includes a liquid injector.

The liquid injector injects the liquid in a direction that tilts with respect to a normal to the surface of the display panel on which the film is stuck.

In the above apparatus, it is preferable that the liquid injector starts the injection of the liquid at the boundary between one end of the film and the display panel so as to remove the film successively from said one end to the opposite end.

The above apparatus further includes a carrier for transporting the display panel. It is preferable that the liquid is injected while transporting the display panel so that the film is removed successively from said one end to the opposite end.

A method for manufacturing a display panel of the present invention includes the following steps: removing a film from a display panel to be used as a material by injecting a liquid in the direction that tilts with respect to a normal to the surface of the display panel to be used as a material on which the film is struck; pulverizing the display panel to be used as a material after removal of the film; and melting a material including the pulverized display panel to be formed into a panel.

The film removal method and apparatus of the present invention easily can remove even a film that adheres firmly to the surface of a display panel in a short time without relying on manual work. Since chemical agents and abrasive materials are not used, the subsequent processes can be eliminated, thus minimizing a load on the environment.

The film removal apparatus of the present invention has a simple configuration that includes no large mechanical driving means other than a carrier, e.g., a conveyor, and thus it is easy to manufacture the apparatus. Therefore, the apparatus can be provided inexpensively, which leads to a reduction in initial cost.

The method for manufacturing a display panel of the present invention easily can remove a film that is stuck on a display panel to be used as a material in a short time, so that the manufacturing cost can be reduced.

DESCRIPTION OF THE PREFERRED EMBODIMENTS

Hereinafter, a method and apparatus for removing a film and a method for manufacturing a display panel according to an embodiment of the present invention will be described with reference to the drawings.

First, the basic configuration of a film removal apparatus and a film removal method of this embodiment will be described by referring to FIGS. 1A to 1C.

Figure 1A:
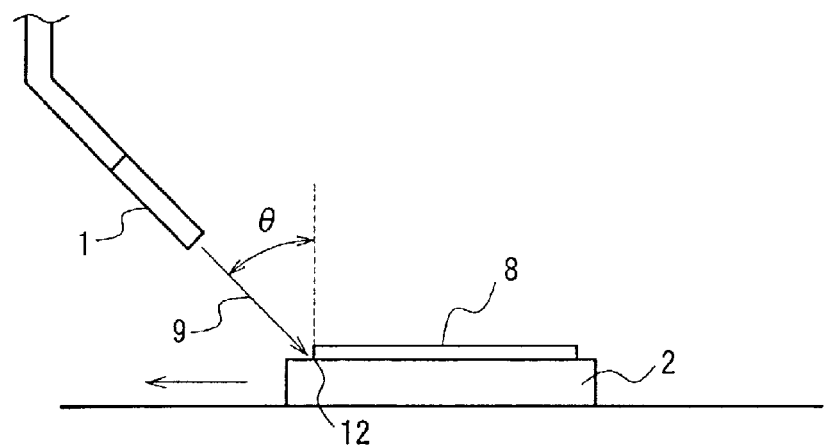
FIGS. 1A to 1C show an example of the basic configuration of a film removal apparatus and an example of a film removal method of the present invention.
Figure 1B:
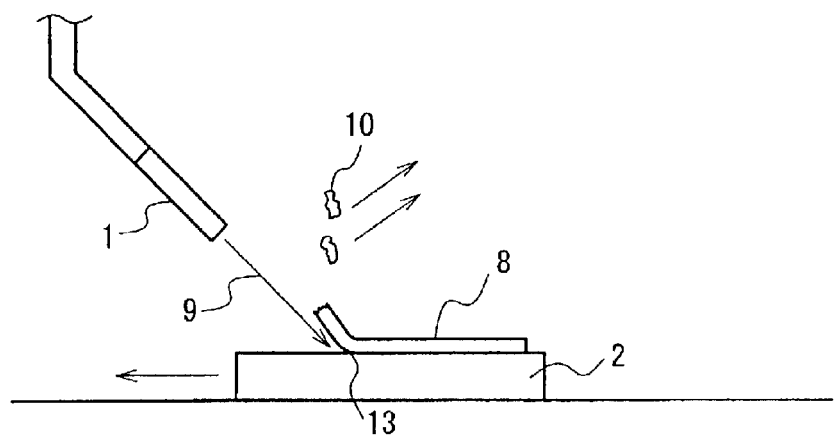
Figure 1C:
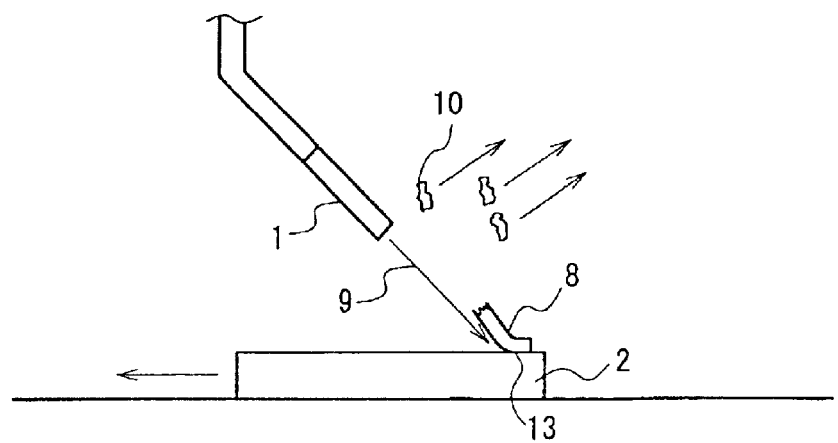

FIGS. 1A to 1C show an example of the basic configuration of the film removal apparatus and an example of the film removal method of the present invention. FIGS. 1A to 1C represent the steps in a continuous removal process.

As shown in FIG. 1A, the film removal apparatus includes a liquid injector 1 for injecting a liquid 9. The apparatus removes a film 8 stuck on a display panel 2 by injecting the liquid 9 from the liquid injector 1. In this embodiment, the liquid 9 is water. The film 8 includes a base film and an adhesive layer. The display panel 2 is a CRT panel, which is to be used as a material in manufacturing a new display panel.

The liquid injector 1 injects the liquid 9 in the direction that tilts with respect to a normal (indicated by a dotted line in FIG. 1A) to the surface of the display panel 2 on which the film 8 is stuck. In FIG. 1A, $\theta$ represents the inclination angle between the direction of injection and the normal. In this embodiment, the inclination angle $\theta$ is, e.g., 45 degrees.

The film removal apparatus of the present invention differs from a conventional example in that the liquid is injected obliquely. Therefore, the liquid 9 from the liquid injector 1 strikes the end face of the film 8 to allow the end of the film 8 to be raised. By injecting the liquid 9 continuously, the film 8 is removed from the display panel 2. This apparatus easily can remove even a film having, e.g., a peel strength of 5000 g/cm or more. The film removal method and apparatus of the present invention are effective in removing a film not only from a flat display panel but also from a curved display panel. For the curved display panel, a liquid also can be injected in the direction that tilts with respect to each normal to the surface of the curved display panel on which the film is stuck.

The film removal apparatus also includes a carrier (not shown) for transporting the display panel 2 in the direction of the arrow (to the left in the drawings). In this embodiment, the speed of transportation is 2 m/min.

As shown in FIGS. 1A to 1C, this embodiment allows the direction of injection by the liquid injector 1 to tilt in the transport direction with respect to the normal to the surface of the display panel 2 on which the film 8 is stuck. The liquid injector 1 may be arranged so as to inject the liquid first onto a boundary 12 between the end of the film 8 on the side of the transport direction and the display panel 2. Thus, the injection of the liquid 9 is started at the boundary 12.

As described above, the liquid injector 1 injects the liquid first onto the boundary 12 to ensure that the film is peeled off and raised from the display panel 2. Once the film 8 is peeled off and raised from the display panel 2, the end of the film 8 thus raised serves as a wall. Therefore, the film 8 can be removed efficiently by the injection pressure of the liquid 9 and the force that acts in the transport direction due to the carrier.

For this reason, the liquid should be injected precisely onto the boundary 12 between the end of the film 8 and the display panel 12, as shown in FIG. 1A. It is particularly preferable that the position accuracy is within ±2 mm.

Figure 3:
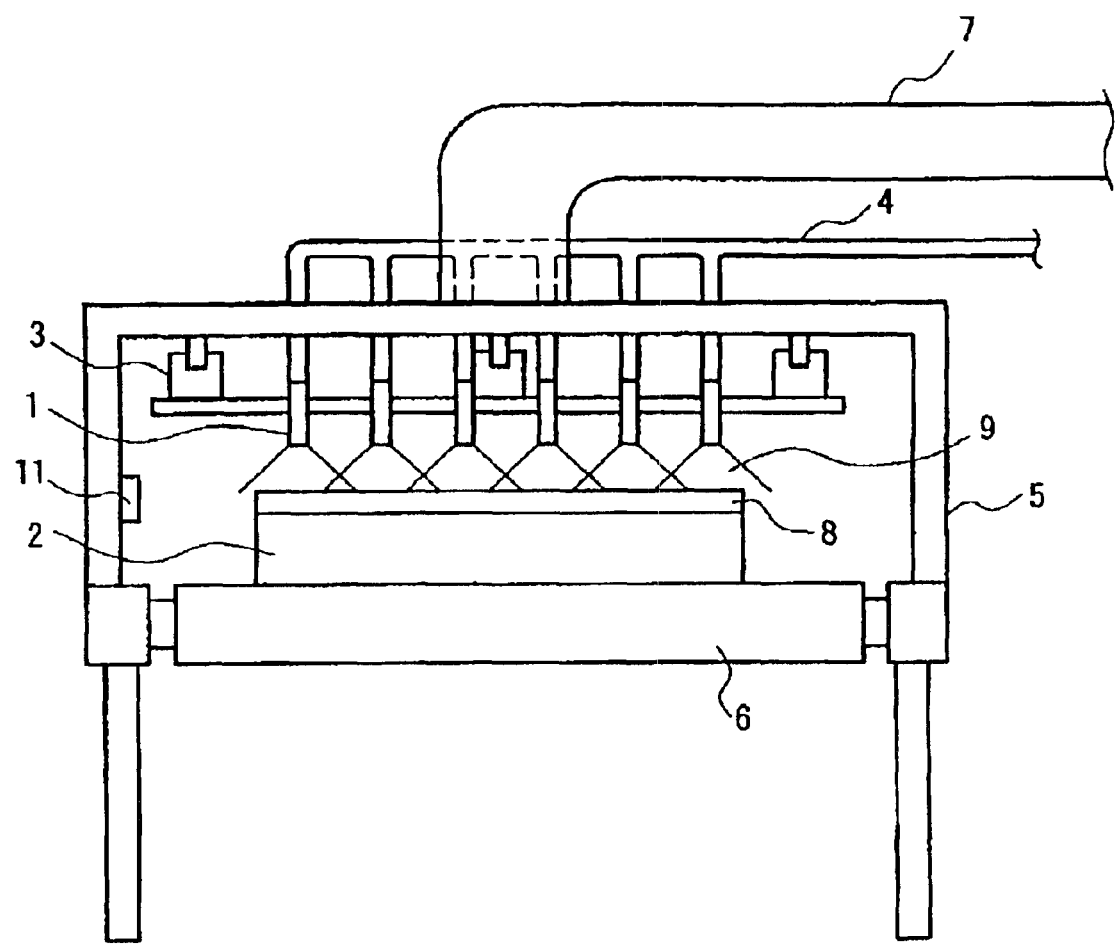
FIG. 3 is a schematic view showing the inside of an injection booth of the film removal apparatus in FIG. 2.

The film removal apparatus of this embodiment may include a plurality of liquid injectors 1, each of which injects the liquid 9 in the form of a fan when viewed from the transport direction, as shown in FIG. 3. The shape of the injected liquid is not a cone, but a fan having a small thickness, so that the liquid 9 essentially linearly strikes the end of the film 8. This makes it possible to inject the liquid 9 along the entire boundary. It is preferable that the fan-shaped liquid 9 has a thickness of 5 mm to 20 mm at the position where it comes into contact with the film.

As shown in FIGS. 1B and 1C, the injection is performed while transporting the display panel 2, and the liquid 9 always is injected onto a boundary 13 between the display panel 2 and the end of the film 8 that adheres to the display panel 2 on the side of the transport direction. Thus, the strong stream of the liquid 9 can remove the film 8 successively from one end to the other end in the opposite direction to the transport direction. The removed film is smashed with the liquid 9 to pieces 10, which are scattered and then removed by an exhaust system shown in FIGS. 2 and 3.

The inclination angle θ of the liquid injector 1 can be set appropriately in accordance with the peel strength of the film 8 and is not particularly limited, as long as it is more than 0 degree and less than 90 degrees. When the inclination angle θ is less than 40 degrees or more than 50 degrees, the amount of liquid that strikes the end face of the film 8 may decrease to make the removal force smaller. Therefore, it is preferable that the inclination angle θ should be in the range of 40 degrees to 50 degrees.

The injection pressure and the flow rate of the liquid 9 from the liquid injector 1 can be set appropriately in accordance with the peel strength of the film 8 and the operating cost. Specifically, it is preferable that the injection pressure should be in the range of 300 kg/cm$^2$ to 1300 kg/cm$^2$, taking into account the minimum force to remove the film 8 and an increase in size and equipment cost of the apparatus when the injection pressure is enlarged. It is preferable that the flow rate should be in the range of 10 l/min. to 50 l/min. for the same reason. The injection pressure may be determined by adjusting the liquid injector.

In the present invention, the liquid 9 is not limited to water, and any liquid can be used as long as it is capable of removing the film 8. The liquid 9 preferably includes an abrasive material or abrasive grains to make removal of the film 8 easier.

Figure 2:
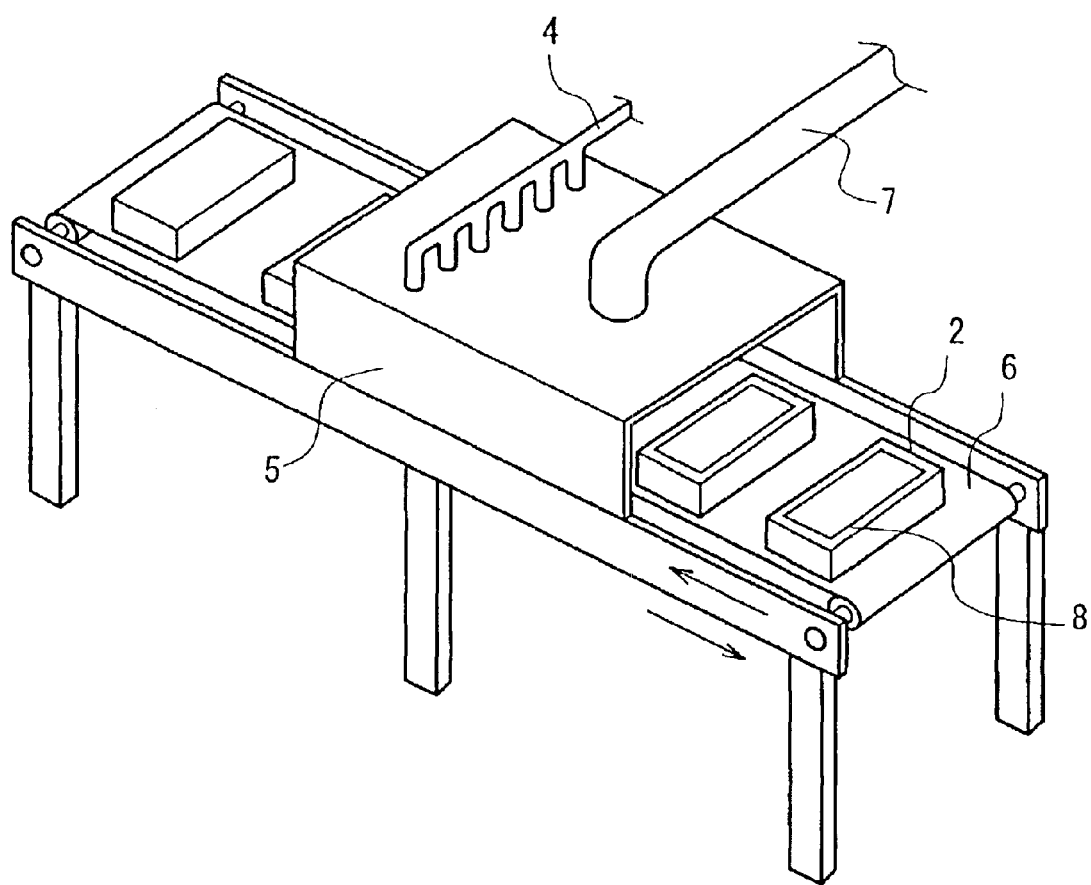
FIG. 2 is a perspective view schematically showing an example of the appearance of a film removal apparatus of the present invention.

Next, the whole configuration of a film removal apparatus of this embodiment will be described by referring to FIGS. 2 and 3. FIG. 2 is a perspective view schematically showing an example of the appearance of a film removal apparatus of the present invention. FIG. 3 is a schematic view showing the inside of an injection booth of the film removal apparatus in FIG. 2.

As shown in FIG. 2, the film removal apparatus of this embodiment is provided with a conveyor 6 as a carrier. An injection booth 5 that includes a liquid injector (not shown) is located near the center of the conveyor 6. This embodiment uses a porous mesh belt as the belt of the conveyor 6. Therefore, water injected by the liquid injector in the injection booth 5 passes through the belt, is collected in one place, and then is recycled. FIG. 2 does not show a circulation system for recycling the injected water.

An exhaust duct 7 is provided on the top surface of the injection booth 5. The exhaust duct 7 functions as an exhaust system for carrying out small pieces of the film that has been removed and smashed. Those small pieces of the film are carried away by the exhaust duct 7 and discharged outside the film removal apparatus. Reference numeral 4 denotes a supply pipe for supplying a liquid to the liquid injector 1.

Next, the arrangement of the liquid injector 1 in the injection booth 5 will be described by referring to FIG. 3. FIG. 3 shows the inside of the injection booth 5 when viewed from the side at which the display panel 2 is fed to the apparatus. In the example of FIG. 3, six liquid injectors 1 are spaced at constant intervals in the width direction of the display panel 2. In the example shown in FIG. 3, the space between the liquid injectors is 150 mm.

Each of the liquid injectors 1 injects a liquid 9 in the form of a fan, as illustrated in FIG. 3. The width of the fan-shaped liquid 9 is set so as not to leave a portion of the film 8 that is not subjected to the liquid 9. In this embodiment, the size of the film 8 is 500 mm×800 mm, and thus the fan-shaped liquid 9 has a width of about 200 mm at the position where it comes into contact with the film 8.

As described above, this embodiment employs six liquid injectors 1. However, the present invention is not limited thereto, and the number of liquid injectors can be set appropriately in accordance with the injection pressure and the flow rate, so that the fan-shaped liquid is applied uniformly to the entire surface of the display panel 2 to remove the film completely.

In FIG. 3, reference numeral 11 denotes a height detector for detecting the height of the display panel 2, and 3 denotes an elevator for transporting the liquid injectors 1 up or down in accordance with the height of the display panel 2 detected by the height detector 11. The film removal apparatus of this embodiment also includes a controller (not shown) for operating the elevator based on a signal output from the height detector.

As the height detector, e.g., an optical sensor that utilizes a laser beam can be used. Examples of the elevator include a hydraulic cylinder, a pneumatic cylinder, and a linear motor.

In general, the height of the display panel 2 differs according to the size thereof. It also depends on a variation caused by dividing the display panel. Therefore, when the upper and the lower position of the liquid injector 1 are fixed, the distance between the liquid injector 1 and the display panel 2 varies. The injection speed becomes smaller than a predetermined value particularly with an increase in the distance, thus reducing the force to remove the film 8. Moreover, it is difficult to keep the position accuracy constant in the portion for injection.

To solve the above problem, the film removal apparatus of this embodiment allows the position of the liquid injector 1 to be moved up or down with the elevator 3 based on the height of a CRT panel that is measured by the height detector 11. Thus, a sufficient injection speed and the position accuracy can be ensured to achieve the precise injection of a liquid onto the boundary 12 between the end of the film 8 and the display panel 2.

When a body on which the film is stuck is lightweight, the body may be shifted or blown away by oblique injection of a liquid. Therefore, the body should be fixed on the carrier. In the present invention, however, the body is the display panel 2 that has a sufficient weight. Accordingly, there is little chance that the display panel 2 is shifted by jets of the liquid 9, even if the liquid 9 is injected obliquely. Thus, precise injection can be performed without particularly fixing the display panel 2 on the conveyor 6, and uniform application of the jets of the liquid 9 can be performed successively on the entire surface of the display panel 2, as shown in FIGS. 2 and 3.

In the film removal apparatus of this embodiment, the injection timing is calculated based on the time at which the height detector 11 detects the display panel 2 and the speed of transportation of the carrier (conveyor 6), and the liquid injector 1 starts injection according to this timing. Therefore, it is possible to remove the film 8 automatically only by placing the display panel 2 on the carrier.

In this embodiment, the display panel 2 on which the film 8 is stuck moves relative to the liquid injector 1. However, the present invention is not limited to this example, and allows the liquid injector 1 to be moved instead of using the carrier.

The film removal method and apparatus of the present invention can be applied to any type of film to be removed. They are effective particularly for a resin film that can be formed into a thickness of several hundreds of micrometers or less and have high strength, dimensional stability, and transparency. This kind of resin film is made of a resin material, such as polyethylene terephthalate (PET), polyethylene (PE), polypropylene (PP), polybutylene terephthalate (PBT), polyimide (PI), polyethylene naphthalate (PEN), and polyetherimide (PED).

The film removal method and apparatus of the present invention also can be applied to any type of adhesive for sticking the film to be removed. They are effective particularly for an adhesive that has high transparency, no specific color, and long-term resistance to heat and moisture. Examples of such an adhesive include an acrylic adhesive, a cellulose adhesive (typified by cellulose ester), an adhesive obtained by vinyl polymerization (typified by polyvinyl acetate), an adhesive obtained by polycondensation/polyaddition (typified by polyamide), a thermosetting resin adhesive (typified by an epoxy adhesive and an urethane adhesive), and a rubber adhesive (typified by nitrile rubber).

Figure 4:
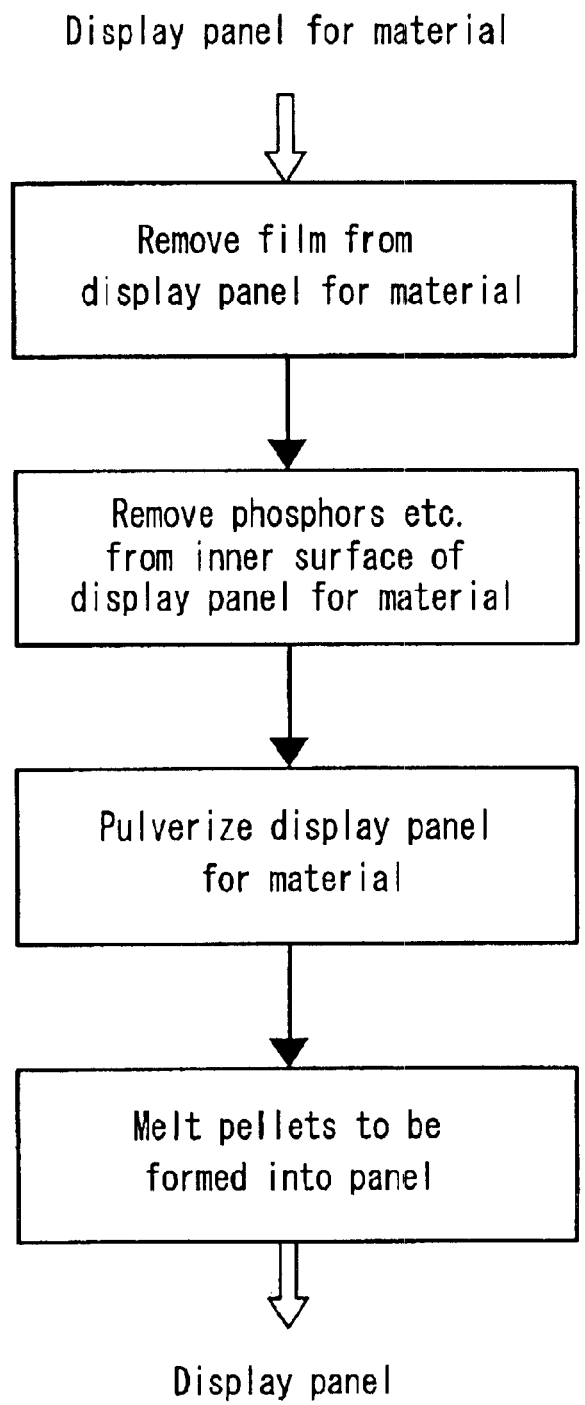
FIG. 4 is a flow chart showing an example of a method for manufacturing a display panel of the present invention.
Figure 5:
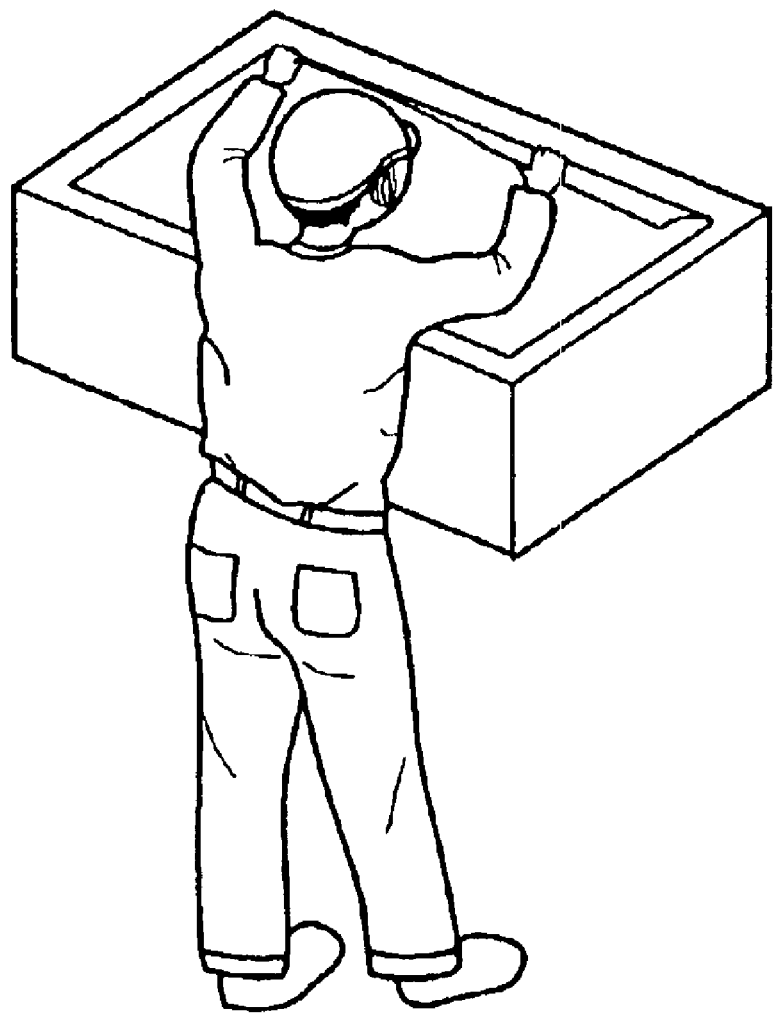
FIG. 5 shows a conventional process of removing a resin film.

Next, a method for manufacturing a display panel of this embodiment will be described by referring to FIG. 4. FIG. 4 is a flow chart showing an example of the method for manufacturing a display panel.

As shown in FIG. 4, first, a film that is stuck on a display panel to be used as a material (hereinafter, referred to as "a display panel for material") is removed. The removal of the film is performed according to the process in FIGS. 1A to 1C by using the apparatus illustrated in FIGS. 1 to 3.

Then, phosphors etc. are removed from the inner surface of the display panel for material. When the display panel for material is a CRT panel, phosphors, dug (a graphite film), and evaporated aluminum, which are applied to the inner surface of the panel, should be removed. Specifically, the phosphors, dug, and evaporated aluminum are scraped off, e.g., with a metallic brush and carried off, e.g., with a vacuum cleaner. Subsequently, the inner surface of the panel is washed as needed. When the display panel for material is a PD panel, two glass sheets constituting the PD panel are separated, and then phosphors, partitions, and dielectrics etc. that have been present between the glass sheets are removed. Specifically, like the CRT panel, the phosphors, partitions, and dielectrics etc. are scraped off, e.g., with a metallic brush and carried off, e.g., with a vacuum cleaner.

After removing phosphors etc., the display panel for material is pulverized into pellets. Specifically, the display panel for material is divided into a plurality of parts by dropping it from a predetermined height, and the parts are crushed into very small pieces, e.g., with a hammer. Finally, the small pieces are ground in a grinder, and then barrel-polished. It is preferable that the pulverized pellets have a maximum length of 5 cm to 10 cm.

Next, the pellets are melted to be formed into a panel. When the display panel for material is a CRT panel, the pulverized pellets obtained by the above process are mixed with pellets of a virgin material at a weight ratio of about 1:9, which then are melted approximately at 1500° C. to 1600° C. Similarly, when the display panel for material is a PD panel, the pulverized pellets obtained by the above process are mixed with pellets of a virgin material at a weight ratio of about 1:9, which then are melted approximately at 1600° C.

Thereafter, phosphors etc. are applied to the inner surface of the resultant panel, and a film is stuck on the outer surface thereof, thus producing a display panel.

EXAMPLES

A film removal apparatus shown in FIGS. 1 to 3 was produced and tested for evaluation. The conditions of the evaluation tests were as follows:

(A) Display Panel

A 32-inch CRT panel taken out of a TV that was used for five years (B) Film

1. Base film: a polyethylene terephthalate (PET) film for optical purposes, having a thickness of 188 μm and a size of 500 mm×800 mm
2. Adhesive: an acrylic adhesive having a thickness of 25 μm
3. Peel strength: about 1000 g/inch (394 g/cm)

Next, a display panel on which the above film was stuck was placed on a carrier and then injected with a liquid. The injection was performed by varying the inclination angle, the injection pressure, and the flow rate, as shown in Table 1. Moreover, the width of a fan-shaped liquid illustrated in FIG. 3 was set to about 200 mm at a position that was 200 mm away from the tip of a liquid injector. The distance between the tip of the liquid injector and the object to be injected was 200 mm. Table 1 shows the results.

TABLE 1

| Conditions | No. 1 | No. 2 | No. 3 | No. 4 | No. 5 | No. 6 | No. 7 | No. 8 | No. 9 |
|---|---|---|---|---|---|---|---|---|---|
| Inclination angle θ [degree] | 25 | 35 | 40 | 45 | 45 | 50 | 55 | 75 | 0 |
| Injection pressure [kg/cm$^2$] | 1000 | 1000 | 1000 | 700 | 500 | 1000 | 1000 | 1000 | 700 |
| Flow rate [l/min.] | 50 | 50 | 50 | 50 | 30 | 50 | 50 | 50 | 50 |
| Transport speed [mm/sec.] | 33 | 33 | 33 | 33 | 33 | 33 | 33 | 33 | 33 |
| Results | ○ | ○ | ⊙ | ⊙ | ⊙ | ⊙ | ○ | ○ | X |
|  | 50% of the film was left. | 25% of the film was left. | The film was removed completely. | The film was removed completely. | The film was removed completely. | The film was removed completely. | 25% of the film was left. | 50% of the film was left. | Most of the film was not removed. |

The results in Table 1 clearly show the correlation between the inclination angle and the removal performance under the above conditions. As can be seen from Table 1, when the inclination angle is in the range of 40 degrees to 50 degrees, which corresponds to No. 3 to No. 6, the film can be removed completely with only one injection.

In particular, when the inclination angle is 45 degrees, the complete removal of the entire film can be achieved, even if the injection pressure and the flow rate are reduced to 500 kg/cm$^2$ and 30 l/min., respectively, though this is not shown in Table 1. The injection angle of 45 degrees also makes it possible to remove the film easily by setting the injection pressure and the flow rate approximately to 1000 kg/cm$^2$ and 30 l/min., even if the adhesive strength of the film is about 0.79 kg/cm, though this is not shown in Table 1.

When the inclination angle is not more than 25 degrees or not less than 75 degrees, which corresponds to No. 1, 2, 7 and 8, it is difficult to remove the film completely with only one injection. However, the complete removal of the film can be achieved by repeating the injection.

As described above, the film removal apparatus of the present invention ensures that a film stuck on a display panel can be removed easily without relying on manual work.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for removing a film from a display panel, comprising:

subjecting a film stuck on a display panel to a liquid injected from a liquid injector, wherein the liquid is injected in a direction that tilts with respect to a normal to a surface of the display panel on which the film is stuck while moving the liquid injector and the display panel relative to each other, and the liquid is injected so as to strike an end of the film on the liquid injector side along a boundary between the end of the film on the liquid injector side and the display panel, and thus the end of the film on the liquid injector side is raised.

2. The method according to claim 1, wherein the injection of the liquid is started at a boundary between one end of the film and the display panel so as to remove the film successively from said one end to an opposite end.

3. The method according to claim 2, wherein the liquid is injected while transporting the display panel so that the film is removed successively from said one end to the opposite end.

4. The method according to claim 3, wherein the liquid is injected in the form of a fan.

5. The method according to claim 1, wherein the display panel is one selected from a CRT panel and a PD panel.

6. The method according to claim 1, wherein a height of the display panel is detected, and a position at which the liquid is injected is moved up or down in accordance with the height of the display panel.

7. The method according to claim 1, wherein the removed film is carried away by an air flow.

8. The method according to claim 1, wherein an angle between the direction of injection and the normal is in a range of 40 degrees to 50 degrees.

9. The method according to claim 1, wherein the liquid is injected so that an injection pressure is in a range of 300 kg/cm$^2$ to 1300 kg/cm$^2$.

10. The method according to claim 1, wherein the liquid is injected so that a flow rate is in a range of 10 l/min. to 50 l/min.

11. An apparatus for removing a film stuck on a display panel by injecting a liquid comprising:

a liquid injector, for injecting a liquid in a direction that tilts with respect to a normal to a surface of the display panel on which the film is stuck, wherein the liquid is injected while moving the liquid injector and the display panel relative to each other so that the liquid strikes an end of the film on the liquid injector side along a boundary between the end of the film on the liquid injector side and the display panel and thus the end of the film on the liquid injector side is raised.

12. The apparatus according to claim 11, wherein the liquid injector starts the injection of the liquid at a boundary between one end of the film and the display panel so as to remove the film successively from said one end to the opposite end.

13. The apparatus according to claim 12, further comprising a carrier for transporting the display panel, wherein the liquid is injected while transporting the display panel so that the film is removed successively from said one end to the opposite end.

14. A method for manufacturing a display panel comprising:

(a) removing a film stuck on a display panel to be used as a material by injecting a liquid from a liquid injector in a direction that tilts with respect to a normal to a surface of the display panel to be used as a material on which the film stuck while moving the liquid injector and the display panel relative to each other;

(b) pulverizing the display panel to be used as a material after removal of the film; and (c) melting a material including the pulverized display panel to be formed into a panel, wherein (a) the liquid is injector so as to strike an end of the film on the liquid injector side along a boundary between the end of the film on the liquid injector side and the display panel, and thus the end of the film on the liquid injector side is raised.

15. The method according to claim 1, wherein the liquid is injected so as to strike the end of the film on the liquid injector side along the entire boundary between the end of the film on the liquid injector side and the display panel.

16. The apparatus according to claim 11, wherein the liquid is injected so as to strike the end of the film on the liquid injector side along the entire boundary between the end of the film on the liquid injector side and the display panel.

* * * * *